US009595995B2

(12) United States Patent
Ray et al.

(10) Patent No.: US 9,595,995 B2
(45) Date of Patent: Mar. 14, 2017

(54) SYSTEMS AND METHODS FOR SIGNAL PROCESSING USING POWER SPECTRAL DENSITY SHAPE

(71) Applicant: THE BOEING COMPANY, Huntington Beach, CA (US)

(72) Inventors: Gary Alan Ray, Issaquah, WA (US); James Bryan Baker, Covington, WA (US)

(73) Assignee: The Boeing Company, Chicago, IL (US)

( * ) Notice: Subject to any disclaimer, the term of this patent is extended or adjusted under 35 U.S.C. 154(b) by 26 days.

(21) Appl. No.: 14/557,916

(22) Filed: Dec. 2, 2014

(65) Prior Publication Data

US 2016/0156382 A1    Jun. 2, 2016

(51) Int. Cl.
*H04B 1/00* (2006.01)
*H04B 1/7105* (2011.01)
*H04B 15/00* (2006.01)
*H04J 11/00* (2006.01)

(52) U.S. Cl.
CPC ........... *H04B 1/7105* (2013.01); *H04B 15/00* (2013.01); *H04J 11/003* (2013.01)

(58) Field of Classification Search
CPC ....... H04B 1/7117; H04B 1/712; H04B 1/707
USPC ................. 375/144, 140, 141, 130
See application file for complete search history.

(56) References Cited

U.S. PATENT DOCUMENTS

| 7,657,230 | B2* | 2/2010 | Rowitch | H04L 1/0059 375/254 |
| 9,185,506 | B1* | 11/2015 | Deng | G10K 11/175 |
| 2003/0112967 | A1* | 6/2003 | Hausman | H04B 3/23 379/417 |
| 2008/0025439 | A1* | 1/2008 | Al-Eidan | H04L 27/12 375/334 |
| 2009/0175384 | A1* | 7/2009 | Perrins | H04L 25/03184 375/324 |
| 2013/0310093 | A1* | 11/2013 | Giannakis | H04W 24/02 455/501 |
| 2014/0029680 | A1* | 1/2014 | Ray | H04L 27/0008 375/259 |

* cited by examiner

Primary Examiner — Helene Tayong
(74) Attorney, Agent, or Firm — Armstrong Teasdale LLP

(57) ABSTRACT

A signal processing method is provided. The signal processing method includes receiving, at a signal processing system, a signal of interest, calculating, using the signal processing system, a power spectral density for the signal of interest, calculating, using the signal processing system, a basis vector based on the power spectral density shape, performing, using the signal processing system, a linear regression using the basis vector to generate an estimate for at least one parameter of the signal of interest, and transmitting, based on the at least one generated estimate, a signal that avoids interference with the signal of interest.

20 Claims, 10 Drawing Sheets

SYSTEMS AND METHODS FOR SIGNAL PROCESSING USING POWER SPECTRAL DENSITY SHAPE

BACKGROUND

The field of the disclosure relates generally to signal processing, and, more particularly, to estimating signal parameters based on power spectral density shape.

Wireless communication systems that compete for spectrum usage (such as those operating in white spaces or cognitive radio systems) must determine the presence of existing signals in order to avoid interfering with those existing signals. This determination may be difficult, and involves issues such as the near-far problem. Specifically, while a first signal from an existing transmitter may be far away or weak relative to an additional signal source, a receiver may be much closer to the additional signal source. If the additional signal source sends out a powerful signal in a frequency near a frequency of the first signal, the powerful signal may significantly interfere with the receiver's ability to detect the first signal. This problem is exacerbated further when the first signal is so weak that it is undetectable as an existing signal and simply looks like noise, which could lead to transmission directly on top of the first signal.

With exponential growth in wireless communications, both for civilian and military usage, comes the need to cost effectively and quickly modify a radio device to meet new uses and operate on existing frequencies. The ideal device would be a single physical radio that implements all existing communication signals and protocols, as well as one that adapts to new and future conditions to effectively use different communications resources when desired. Software-defined radio (SDR) technology brings these benefits of flexibility and cost efficiency to end users. In order for SDR to participate with other systems (both SDR and legacy), it must compete for spectrum and cooperate with other systems. In order to cooperate, SDR must be able to sense when other signals are present and avoid interfering with them.

The near-far problem, discussed briefly above, is a problem that exists with current wireless radio networks, including those using direct-sequence spread-spectrum multiple access (DS/SSMA) communication systems, and also systems that must simply determine which legacy (i.e., non-spread) signals are present before deciding on a transmit channel and signal type. For example, code division multiple access (CDMA) type systems achieve multiple-access capability by assigning a distinct signature waveform to each user from a set of waveforms with low mutual cross correlations. Two conditions must be satisfied for this to occur. First, the multi-user CDMA signal set must have low cross-correlations for all possible delays between different user data streams. Second, the power of the received signals must be similar. If either of these conditions is not fulfilled, then bit-error-rate and anti-jamming capabilities of CDMA receivers for multiple users may be degraded. Known solutions include using power control or designing CDMA signals with sharper cross correlation properties.

These issues with CDMA signal sets are also present, albeit modified, in situations where legacy (i.e., non-spread) signals are present. For example, suppose a system includes an SDR or cognitive transceiver that must sense which signals are present and must decide, among other things, i) what legacy receiver systems should be supported, ii) what signal types to transmit (CDMA, frequency-shift keying, binary phase-shift keying, quadrature phase-shift keying, etc.), iii) what signals parameters to use (frequency, duration, time slots, etc.), iv) what data rates to support, v) what power levels to use, and/or vi) what data latency to support. These decisions will be partially based on the types and powers of signals already present. Specifically, in order to coexist in a competitive spectrum environment, signals to be transmitted must not substantially interfere with current signals, and must not be substantially interfered with by current signals.

At least some known methods to solve this non-interference problem have limited ability to operate at relatively low signal to noise ratios (SNRs), leading to incorrect decisions about the presence of legacy signals and therefore incorrect decisions about the signals to transmit. To overcome this, in certain circumstances, correlation can be performed using specific knowledge about existing signal preambles to operate at low SNR levels. However, such methods require substantial foreknowledge, which is not likely to be available, and only applies to digital signals.

BRIEF DESCRIPTION

In one aspect, a signal processing method is provided. The signal processing method includes receiving, at a signal processing system, a signal of interest, calculating, using the signal processing system, a power spectral density for the signal of interest, calculating, using the signal processing system, a basis vector based on the power spectral density shape, performing, using the signal processing system, a linear regression using the basis vector to generate an estimate for at least one parameter of the signal of interest, and transmitting, based on the at least one generated estimate, a signal that avoids interference with the signal of interest.

In another aspect, a signal processing system for processing a signal of interest transmitted by a signal source is provided. The signal processing system includes a receiver configured to receive the signal of interest from the signal source, a memory device, and a processor communicatively coupled to said memory device, said processor configured to calculate a power spectral density shape for the signal of interest, calculate a basis vector based on the power spectral density, perform a linear regression using the basis vector to generate an estimate for at least one parameter of the signal of interest, and generate, based on the at least one generated estimate, a signal that avoids interference with the signal of interest.

In yet another aspect, a signal processing method is provided. The signal processing method includes receiving, at a signal processing system, a signal of interest, determining, using the signal processing system, a signal to noise ratio (SNR) for the signal of interest, selecting, using the signal processing system, a signal processing technique from a plurality of signal processing techniques based at least in part on the determined SNR, processing, using the signal processing system, the signal of interest using the selected signal processing technique to generate an estimate for at least one parameter of the signal of interest, and transmitting, based on the at least one generated estimate, a signal that avoids interference with the signal of interest.

DETAILED DESCRIPTION

The embodiments described herein allow for estimation of parameters (such as frequency, baud rate, deviation, etc.) of existing but unknown signals that are relatively weak and/or buried in noise. Estimating these parameters enables determining what kinds of signals are present so that wireless communication systems that compete for spectrum space can be configured to broadcast signals at a frequency, baud rate, deviation, etc. that is different from the frequency, baud rate, deviation, etc. of existing but unknown signals, in order to avoid interference. Thus, the systems and methods described herein improve an ability to avoid interference with existing signals when transmitting a signal Accordingly, the systems and methods described herein facilitate identifying one or more parameters of an existing signal that may not otherwise be discernable. As such, the systems and methods described herein may be implemented in any number of real-world signal processing applications (e.g., wireless communication systems, geolocation systems, etc.).

The systems and methods described herein provide improved signal detection and parameter estimation of signals from legacy systems, especially for weak signals. As used herein, "legacy signals" refer to signals transmitted under existing, known formats, and "legacy systems" refer to existing, known signal processing systems. The embodiments described have the following advantages over legacy systems: ability to operate far below the communications SNR limit, accurate parameter estimates for signals with low SNR, gradual parameter estimation error increase as SNR is lowered (leading to better signal detection tracking), a very general technique applicable to all legacy signal types and others that do not use spreading techniques, and providing a method with complementary characteristics to traditional signal detection and parameter estimation, leading to a single amalgamated method covering a wide range of conditions. These advantages provide many benefits directly to software-defined radio (SDR) and cognitive radio applications operating in a competitive spectrum environment.

Figure 1:
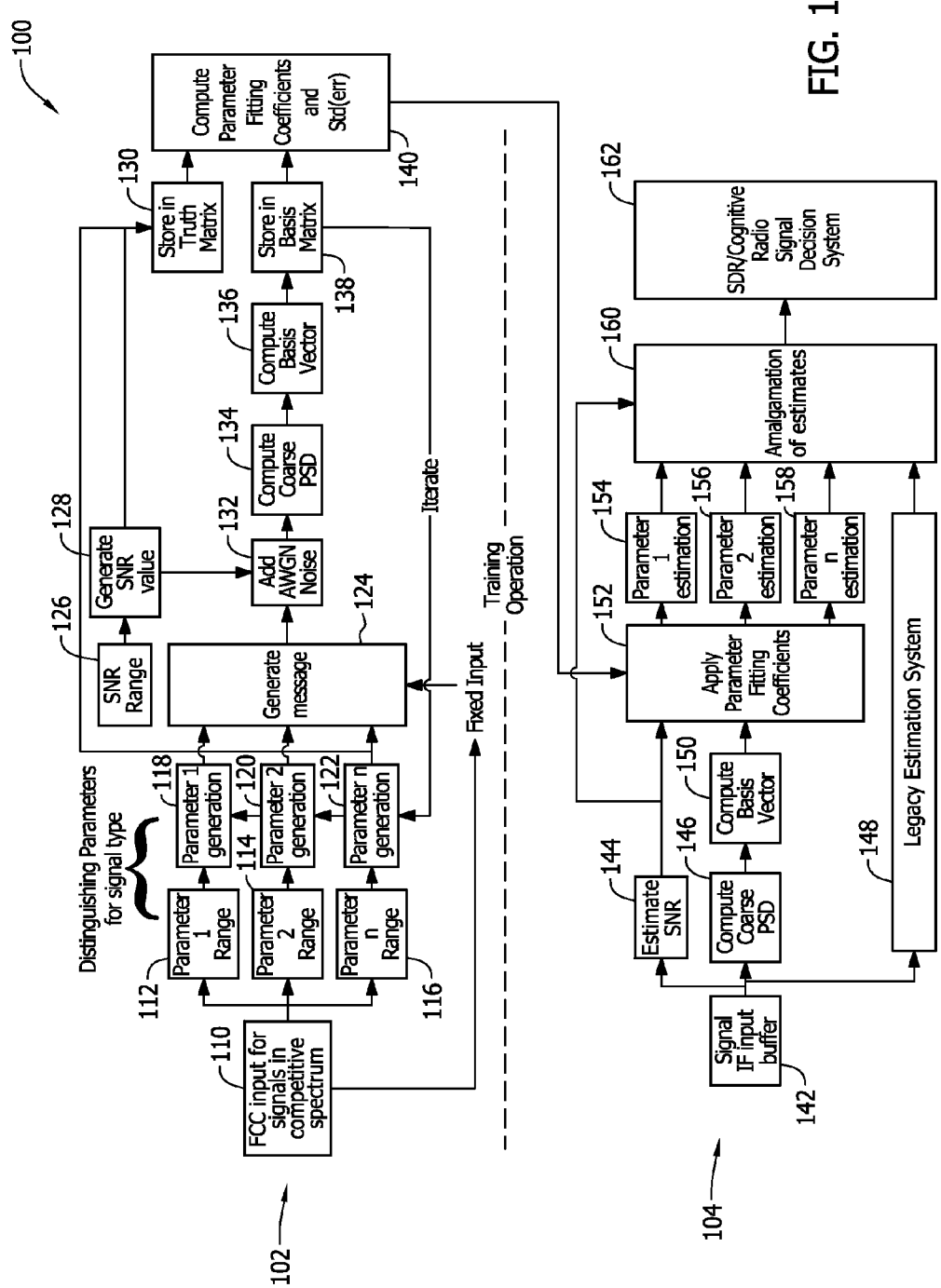
FIG. 1 is a block diagram of an exemplary signal processing methodology.

FIG. 1 is a block diagram of an exemplary signal processing methodology 100. Methodology 100 includes a training component 102 and an operation component 104. At a high-level, training component 102 trains a signal processing system for use during execution of operation component 104. More specifically, during training component 102, a plurality of random messages are generated based on various inputs, power spectral densities and basis vectors indicating properties of those power spectral densities are computed for each random message, and parameter fitting coefficients for use in operation component 104 are calculated from the basis vectors. During operation component 104, parameters (e.g., frequency, baud rate, modulation index, etc.) of a signal of interest are estimated using the parameter fitting coefficients generated as a result of training component 102. By estimating parameters for a signal of interest, a new, different, original, non-interfering signal can be generated with parameters different from those of the signal of interest, thus avoiding interference between the signal of interest and the original signal. Training component 102 and operation component 104 will now be described in more detail.

During training component 102, a representative set of signals is generated, each random signal including a plurality of parameters to be estimated by operation component 104 (e.g., frequency, baud rate, modulation index, etc.), as well as additional parameters that will not be estimated (e.g., data information). The representative set is created randomly to represent how real signals would be distributed. In training component 102, results of fitting of parameters to a predetermined basis vector (based on a power spectral density (PSD)) are stored in an operational form, as described herein.

In training component 102, at block 110, a Federal Communications Commission (FCC) input for signals in the competitive spectrum is provided. This may be provided, for example, by a user controlling operation of training component. The FCC input specifies possible ranges for parameters in the randomly generated signals. At blocks 112, 114, and 116, the ranges for each parameter to be estimated are provided (see, e.g., Table 1 below) by the user. At blocks 118, 120, and 122, the parameters are randomly generated, and a random message is generated at block 124. A SNR range is provided by the user at block 126, and an SNR value is randomly generated at block 128. The generated SNR value is stored in a truth matrix at block 130, and is used to add additive white Gaussian noise to the generated message at block 132.

At block 134, a coarse power spectral density (PSD) for the message is calculated. The PSD represents the power spectrum of the message across different frequency components. At block 136, a basis vector is computed. The basis vector is a vector defined by a predetermined set of statistical parameters that represent the shape of the PSD. The basis vector is stored in a basis matrix at block 138. This process may be iteratively repeated to generate and store a plurality of basis vectors for each of a plurality of generated messages. At block 140, parameter fitting coefficients and standard deviation error are computed from the basis vectors. These parameter fitting coefficients are used by operation component 104 to estimate parameters for a signal of interest.

Once the system is trained from training component 102, the system can be used to process signals in operation component 104. Specifically, an input signal, also referred to as a signal of interest, is received at block 142. From the input, SNR is estimated at block 144, a coarse PSD is computed at block 146, and a legacy estimation system estimates parameters at block 148. At block 150, a basis vector is computed based on the PSD, and the parameter fitting coefficients computed at block 140 are applied to the computed basis vector at block 152. At blocks 154, 156, and 158, parameter estimates are generated, and those estimates are amalgamated at block 160. The amalgamated estimates are provided to a SDR/cognitive radio signal decision system at block 162 for further processing, as described in detail below.

Figure 2:
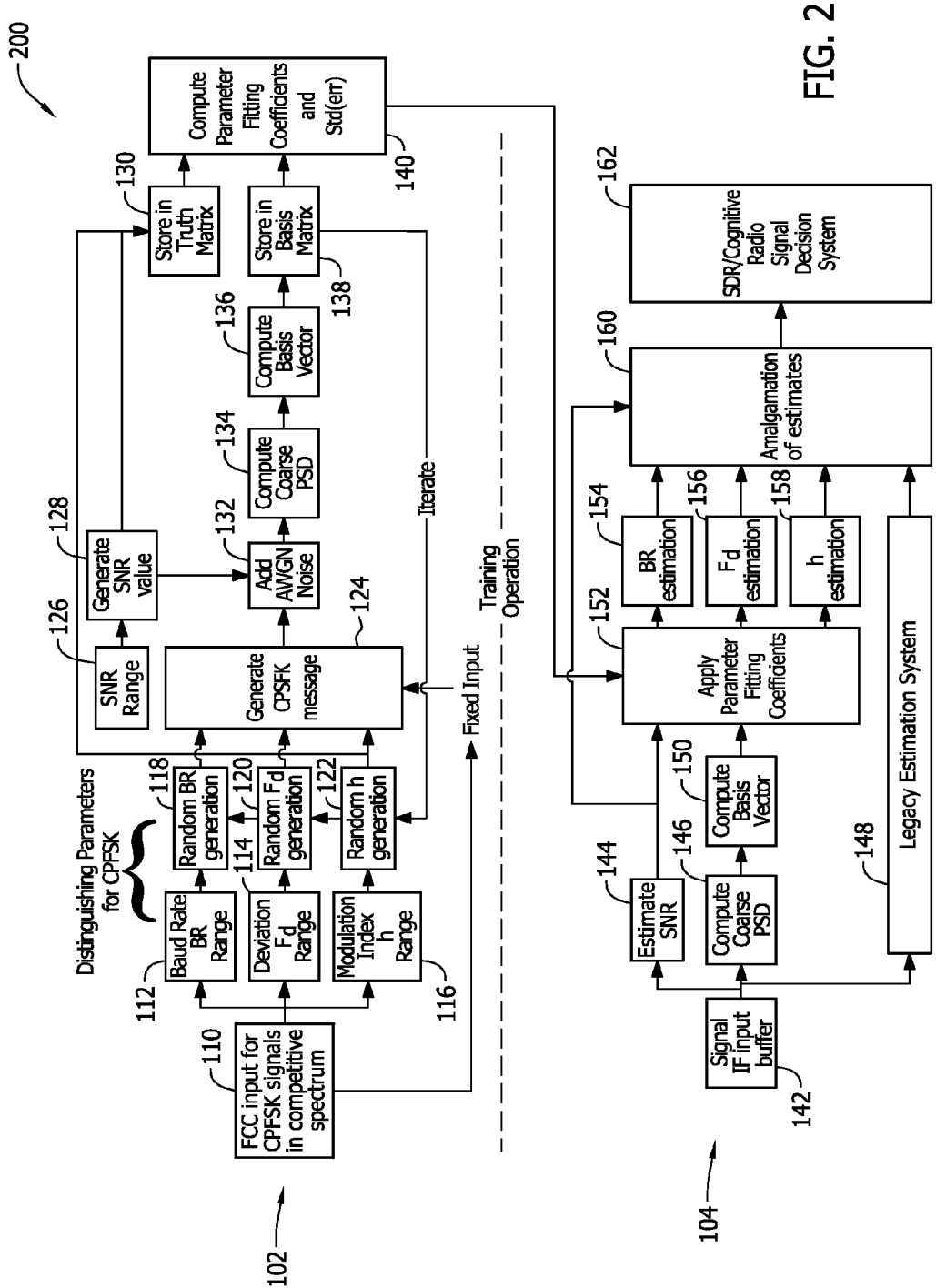
FIG. 2 is a block diagram of an exemplary signal processing methodology.

For ease of explanation, and to show detailed performance characteristics, an exemplary implementation is described for processing a specific type of signal used in legacy radio systems. Specifically, in the particular case of continuous phase frequency shift keying (CPFSK) modulated messages, the generic methodology described in FIG. 1 can be represented specifically for CPFSK as methodology 200, shown in FIG. 2. Specific implementations of more general components shown in FIG. 1 are labeled with like reference numerals in FIG. 2. In methodology 200, three parameters (baud rate (BR), frequency deviation ($F_d$), and modulation index (h)) and SNR are estimated for a signal of interest.

The CPFSK signal will now be described in more detail. The complex form of a CPFSK signal, y(t), can be represented as:

$$y(t) = \sqrt{\frac{2E}{T}} \exp(j\phi(t; I) + \phi_0)$$

and a carrier-modulated CPFSK signal can be represented as:

$$y(t) = \sqrt{\frac{2E}{T}} \cos(2\pi f_c t + \phi(t; I) + \phi_0)$$

where $f_c$ is the carrier frequency, $\phi_0$ is the initial phase, and $$\phi(t;I) = \theta_n + 2\pi h I_n q(t-nT),$$

where h is a modulation index defined as:

$$h = 2f_d T$$

with $f_d$ being the maximum frequency deviation, T being the bit length (1/T is the baud rate), and $$\theta_n = \pi h \sum_{k=-\infty}^{n-1} I_k$$

$$q(t) = \begin{cases} 0 & (t < 0) \\ t/2T & (0 \le t \le T) \\ 1/2 & (t > T) \end{cases}$$

where $I_k$ is the $k^{th}$ bit value defined as a ±1 amplitude (in the case of binary CPFSK).

Figure 3:
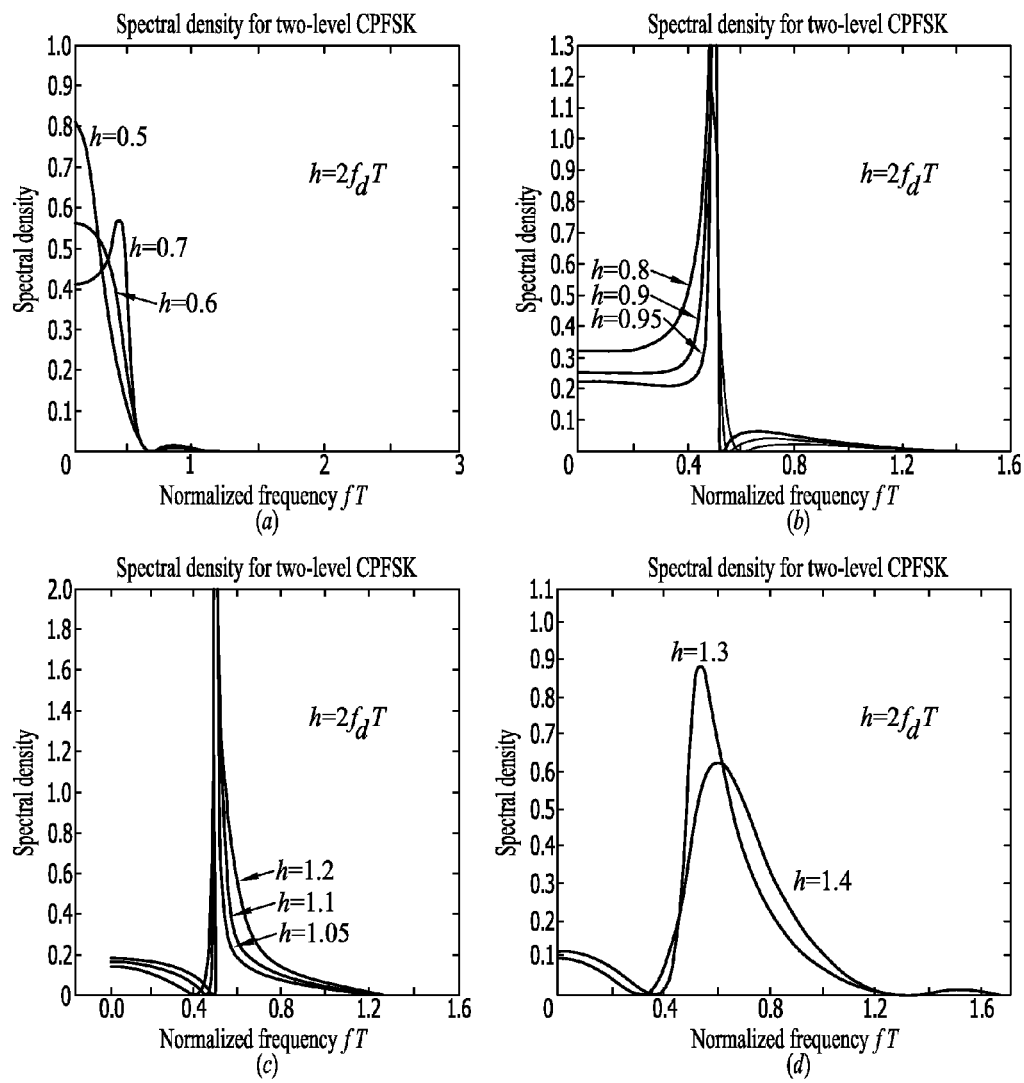
FIG. 3 includes graphs illustrating a power spectral density of CPFSK signals for various modulation indices.

Correspondingly, FIG. 3 shows the power spectral density for a binary CPFSK for various modulation indices h. Notably, the shape of the power spectral density clearly varies as a function of baud rate, BR, and frequency deviation (i.e., the parameters to be estimated). Note also that the frequency axis (x axis) is normalized by the bit length T so that the pulse spectral density (PSD) shape shown only depends on h, rather than both $f_d$ and T as it would if, as in many cases, T is not known. This shape change is exploited in statistical methodology described herein to estimate parameters from the power spectral density.

The power spectral density shape approach to {BR, $F_d$, h} estimation requires computing a PSD with a window size commensurate with the signal duration (i.e., message lengths) to be estimated. For short messages, as few as 16 or 32 samples may be used, whereas longer messages can use longer windows. For short messages, this results in wide frequency bins but a more accurate spectral shape estimate. To derive the PSD shape, several statistical parameters derived from the PSD are first computed. Then, basis vectors are computed from these statistical parameters, and a least square fit is done to estimate each of the three CPFSK parameters: BR, $F_d$, and h. To control the range of a parameter estimator, it is important to set an expected range of the parameters, and to generate long enough messages so that the estimators have reasonably small variance. The following Table 1 contains the ranges assumed for an example simulation of a particular CPFSK implementation to be described (e.g., the ranges used in blocks 118, 120, and 122). The methods described herein, however, apply generally to any CPFSK modulation ranges, not just those listed in Table 1.

TABLE 1

| Parameter | Range |
| --- | --- |
| data | random |
| BR | 8000-24615 bps |
| $F_s$ | 91553 sps |
| h | 0.65-0.75 |
| $F_d$ | 3000-8000 |
| message length | $2^{16}$ samples |
| spectral estimation window | 32 |
| modulation | binary CPFSK |
| SNR (db) | 0, 5, 10, 15, 20, 25, 30, 35, 40 |

In the exemplary implementation, the ten most valuable statistical parameters are the frequency at which the peak occurs, the peak value in the lower and upper half of the PSD, the standard deviations of the lower and upper half of the PSD, and the first and second moments of the lower and upper half of the PSD. These ten statistical parameters were computed from a power spectral density vector, Pxx, and its corresponding frequency vector, F, as shown in the following Table 2 using Matlab notation for their definition. These parameters constitute the basic derivation of shape-related parameters associated with the PSD of a signal. Note that these same statistical parameters can be used for other modulation types, not just CPFSK.

TABLE 2

| # | Statistical Parameter | Description |
| --- | --- | --- |
| 1 | 1st frequency peak $P1_{max}$ | $[P1_{max}, I1_{max}] = \max_{I<N/2}[P_{XX}]/\Sigma_{I<N/2} P_{XX}$ |
| 2 | $P1_{max}$ location $F1_{Fmax}$ | $F1_{max} = F(I1_{Fmax})$ |
| 3 | 2nd frequency $P2_{max}$ | $[P2_{max}, I2_{max}] = \max_{I>N/2}[P_{XX}]/\Sigma_{I>N/2}P_{XX}$ |
| 4 | $P2_{max}$ location $F2_{Fmax}$ | $F2_{max} = 1 - F(I2_{Fmax})$ |
| 5 | 1st $P_{XX}$ standard deviation | $s1 = std_{I<N/2}[P_{XX}]/\Sigma_{I<N/2}P_{XX}$ |
| 6 | 2nd $P_{XX}$ standard deviation | $s2 = std_{I>N/2}[P_{XX}]\Sigma_{I>N/2}P_{XX}$ |
| 7 | 1st moment 1st $P_{XX}$ | $n_1 = \Sigma_{I<N/2}[F(I)P_{XX}(I)]/\Sigma_{I<N/2}P_{XX}$ |
| 8 | 1st moment 2nd $P_{XX}$ | $n_2 = \Sigma_{I>N/2}[(1 - F(I))P_{XX}(I)]/\Sigma_{I>N/2}P_{XX}(I)$ |
| 9 | 2nd moment 1st $P_{XX}$ | $ns_1 = \Sigma_{I<N/2}[F(I)^2 P_{XX}(I)]/\Sigma_{I<N/2}P_{XX}(I)$ |
| 10 | 2nd moment 2nd $P_{XX}$ | $ns_2 = \Sigma_{I>N/2}[(1 - F(I))^2 P_{XX}(I)]/\Sigma_{I>N/2}P_{XX}(I)$ |

From these ten statistical parameters, in an exemplary implementation, a basis vector of length 5 is constructed for each of the N generated CPFSK messages as shown in the following Table 3. Alternatively, the basis vector may include be composed of any suitable number and type of statistical parameters.

TABLE 3

| Coefficient | Basis Vector |
| --- | --- |
| 1 | $P1_{max} + P2_{max}$ |
| 2 | $F1_{max} + F2_{max}$ |
| 3 | $s1 + s2$ |
| 4 | $n1 + n2$ |
| 5 | $\sqrt{ns1} + \sqrt{ns2}$ |

Three linear regressions were computed, one of each of the parameter vectors $\{BR, F_d, h\}$ using an N×5 matrix M formed from all the 5 element row vectors from each generated CPFSK message as given in the following Table 4 (also in Matlab notation). This results in three vectors $\{a_{BR}, b_h, c_{Fd}\}$, each with five elements, corresponding to each of the parameters to be estimated. These vectors correspond to the linear estimator of each of the three scalar parameters being estimated $\{\widetilde{BR}, \widetilde{F}_d, \tilde{h}\}$ for a particular estimation using a given set of statistical parameters in the 1×5 matrix $\widetilde{M}$, and this is also shown in Table 4 below.

TABLE 4

| Linear Regression | Estimator |
| --- | --- |
| Set M = [($\overrightarrow{P1_{max}} + \overrightarrow{P2_{max}}$), ($\overrightarrow{F1_{max}} + \overrightarrow{F2_{max}}$), ($\vec{s1} + \vec{s2}$), ($\vec{n1} + \vec{n2}$), $\sqrt{ns1}\sqrt{} + \sqrt{ns2}\sqrt{}$)] | |
| B = $\overrightarrow{BR}$/Fs; $a_{BR}$ = M\B; | $\widetilde{BR} = (\widetilde{M}a_{BR})F_s$ |
| B = h; $b_h$ = M\B; | $\tilde{h} = (\widetilde{M}b_h)$ |
| B = $F_d/F_s$; $c_{Fd}$ = M\B; | $\widetilde{F}_d = (\widetilde{M}cF_d)F_s$ |

Figure 4:
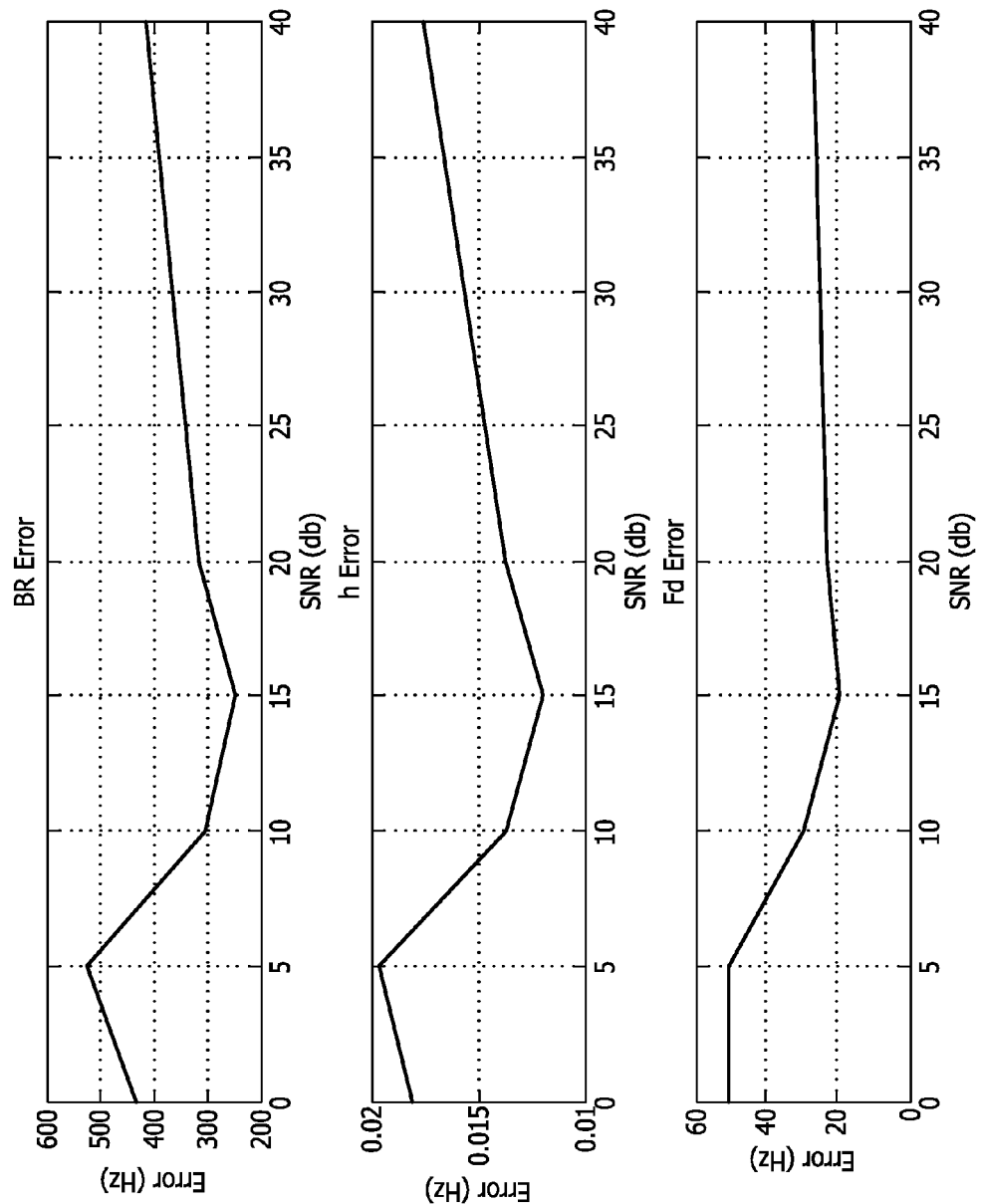
FIG. 4 includes graphs illustrating errors for various parameter estimates using the proposed methodology and SNR dependent estimation described herein.

FIG. 4 shows the results when these estimates are performed for each of the SNR values given in Table 1 for long messages. Notably, the results are quite good across a relatively wide range of SNR values from 0 to 40 dB. The key to this excellent performance is that it requires a separate set of coefficients for each SNR value. In other words, a separate set of coefficient vectors $\{a_{BR,SNR}, b_{h,SNR}, c_{Fd,SNR}\}$ is estimated through the linear regression for each SNR value and then the proper set is chosen in a particular case.

Figure 5:
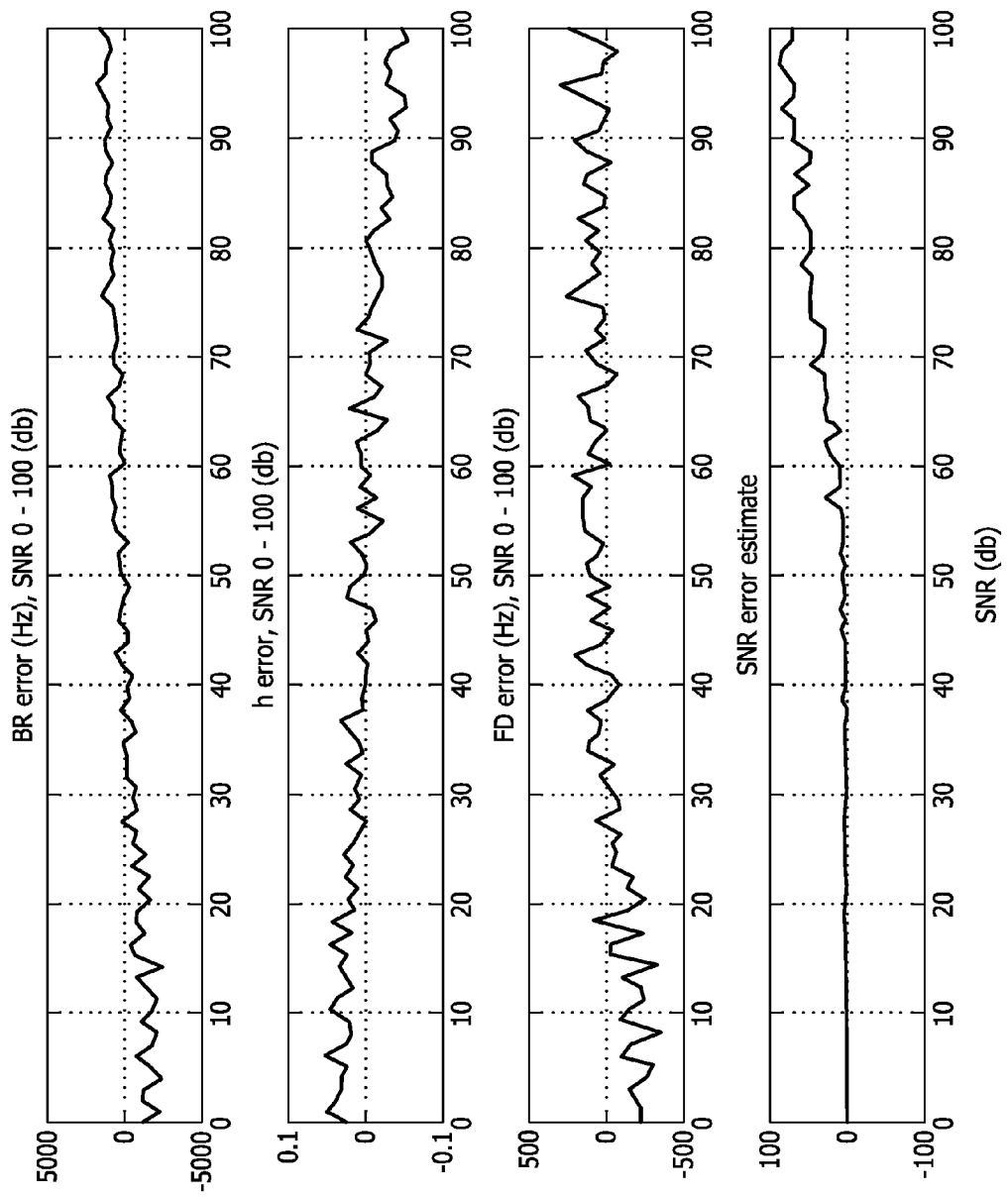
FIG. 5 includes graphs illustrating errors for various parameter estimates by contrast with the proposed methodology and SNR dependent estimation described herein.
Figure 6:
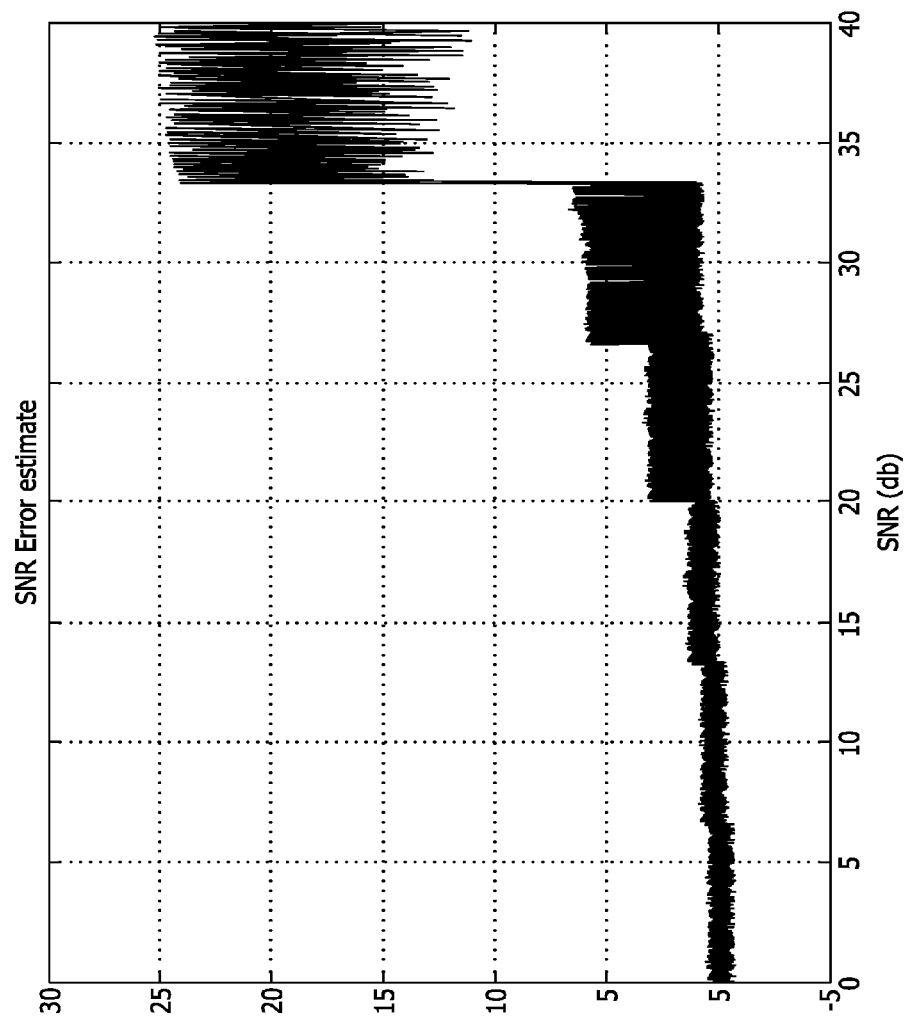
FIG. 6 includes a graph demonstrating the statistics of performing an SNR error estimate multiple times.

By contrast, when an attempt is made to do use one set of coefficient vectors $\{a_{BR}, b_h, c_{Fd}\}$ across an entire range of SNR's, the (much poorer) results are shown in FIG. 5 below. Three things are apparent from FIG. 5:

1) The estimation errors are much larger in the 0 db through 40 db range that was shown in FIG. 4.
2) At higher SNRs (e.g., beyond 40 dB), these estimates become much less accurate. This is because for signals below 40 dB, the noise provides estimation benefits due to the inherent whitening of the sample space resulting from some noise being present, which in term helps statistical methods such as PSD shape estimation. All the estimators get worst at SNR levels above 40 dB.
3) In order to use SNR-dependent coefficients in the estimators, it is desirable to estimate the SNR reasonably well. The fourth subfigure of FIG. 5 shows the accuracy of estimating SNR. In addition, FIG. 6 pictorially displays the estimation errors within 5 dB SNR ranges. As can be seen, the SNR estimator is quite good for the lower SNRs from 0 dB to 40 dB, precisely where it is needed.

Figure 7:
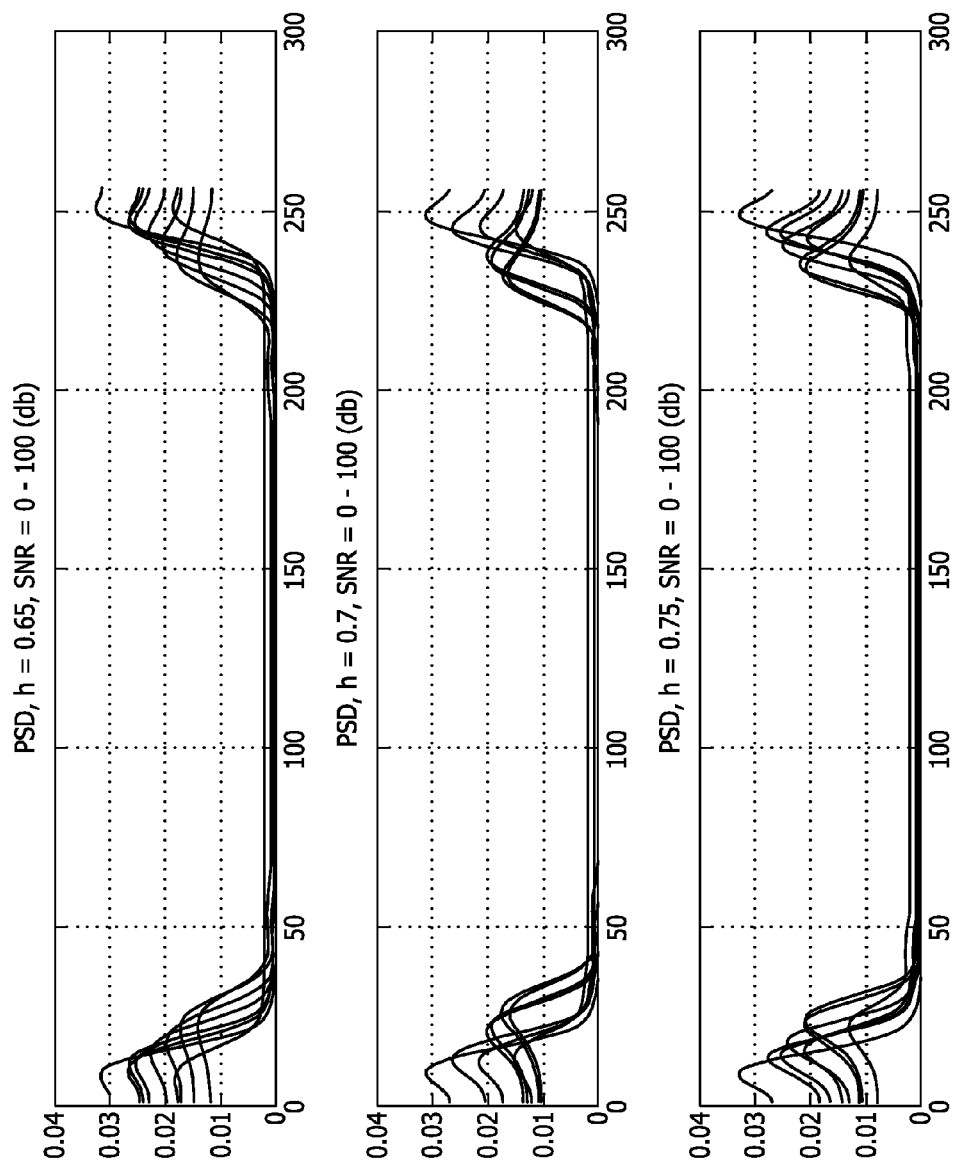
FIG. 7 includes graphs illustrating the power spectral variation for various modulation indices for CPFSK.

To do the SNR estimation accurately requires looking at particular portions of the spectrum that are unaffected by the modulation parameters. FIG. 7 shows the power spectrum for three different modulation indices h across a range of SNR's from 0 db to 100 db and variations in $f_d$ and T. These various choices of $f_d$ and T explain why the PSD shape changes, even though $h=2f_dT$ remains the same.

Therefore, the estimation method for SNR concentrates on the center of the PSD. This portion of the PSD grows uniformly in power directly as the noise increases and is otherwise not substantially affected by the modulation index, maximum frequency deviation, or bit length. The two core statistics used to measure the energy and energy squared in the center portion are shown in the following Table 5.

TABLE 5

| Statistical Parameter | Description |
| --- | --- |
| NP | $NP_{j,k} = (\Sigma_{N_0}^{N_1} P_{XX})/\Sigma P_{XX}$ |
| $NP_2$ | $NP_{j,k} = (\Sigma_{N_0}^{N_1} P_{XX}^2)/\Sigma P_{XX}^2$ |

Then a linear regression to find coefficient vector $d_{SNR}$ is done with approach as shown in the following Table 6, together with the method to estimate SNR for a particular estimation using a given set of statistical parameters in the 1×2 matrix $M_{SNR}$. This estimation uses the reasonable assumption that there is not another overlapping (in frequency) signal next to the CPFSK signal.

TABLE 6

| Linear Regression | Estimator |
| --- | --- |
| Set $M_{SNR} = [\overrightarrow{NP}, \overrightarrow{NP_2}]$ | |
| B = $\overrightarrow{SNR}$; $d_{SNR} = M_{SNR}\backslash B$; | $\widetilde{SNR} = \widetilde{M}_{SNR}d_{SNR}$ |

The PSD shape method described herein can be compared against three different existing techniques for estimating baud rate. Specifically, the PSD shape method can be compared against i) (TD) a time-based demodulation technique for baud rate estimation, ii) (FD) a frequency-based demodulation technique for baud rate estimation, and iii) (TFD) the TD method using a filtered demodulated signal.

The basic comparison is performed by generating CPFSK messages with the following range of values in Table 7, and then adding Gaussian noise to set particular SNRs, and comparing the estimated results to the actual messages.

TABLE 7

| Parameter | Range |
| --- | --- |
| data | random |
| BR | 8000-2461 bps |
| $F_s$ | 91553 sps |
| h | 0.65-0.75 |
| $F_d$ | 3000-8000 |
| message length | 0.008-0.024 sec |
| spectral estimation window | 32 |
| modulation | binary CPFSK |

The known methods for baud rate estimation involve demodulating the CPFSK message and either operating in the time domain or the frequency domain to come up with estimates for baud rate. In the time domain, a search produces the smallest cluster of lengths between bit changes, which should correspond to a single bit length, thus estimating the baud rate. The results in Table 8 below indicate that at 12 dB SNR, the time-domain (TD) estimator stops working rather abruptly. The frequency-domain (FD) method degrades more gracefully, but is generally worse than the time-domain (TD) method for high SNR. The frequency-domain (FD) method demonstrates substantial dependency on the ration of $F_d$/BR values in the signal. Further, the TFD method performs worse than the TD method at high SNR, but provides a better failure indication at lower SNR levels.

Notably, the estimators can give significantly varying results over the modulation index, leading to relatively large potential errors. This is because, on short messages in particular, when the BR is very low, the number of transitions is small, causing potentially large errors in the BR estimator. Also, the time-domain method may fail to find a cluster of bit periods, and consequently declare a BR estimator a failure, not returning an estimate at all. These failure numbers for BR estimation for the TD method are shown in the following Table 8.

TABLE 8

| SNR | #failure/total for TD method |
|---|---|
| 12 | 91/4608 |
| 15 | 0/4608 |
| 20 | 0/4608 |
| 100 | 0/4608 |

Table 8 also illustrates that there is a knee in the curve when the time-domain method starts to fail (i.e., when the SNR drops by 3 dB from 15 dB to 12 dB, the failure rate increases dramatically). In general, below 12 dB SNR, these known methods tend to fail or have significantly larger errors, which is typically not a problem in conventional communications, since a certain minimal level of SNR is generally required for correct operation, such as bit detection. Some basic conclusions of the comparison are as follows:

i) The PSD shape method described herein works very well for very low SNR (<12 dB). At higher SNR values, the errors for the PSD shape method may be greater than known methods (as would be expected by a method that doesn't look at demodulated bits). Furthermore, the PSD method is relatively ineffective for high SNR applications, due to the variation in the PSD as a function of data variation, unless very long messages are used.

ii) The performance of the PSD shape method depends on the ranges of parameters over which it is applied. Results were improved with smaller ranges of BR, $F_d$, and h. Also, to perform the regression to find the coefficients, the ranges are predetermined.

iii) The PSD method fails more slowly as the SNR goes down, as it is not subject to gross errors resulting from picking the wrong cluster or peak.

iv) The TD method fails at SNR levels of 12 dB and below. However, by demodulating and filtering first before finding zero crossing points, the TFD method can be used as a more reliable failure indicator at lower SNRs.

Figure 8:
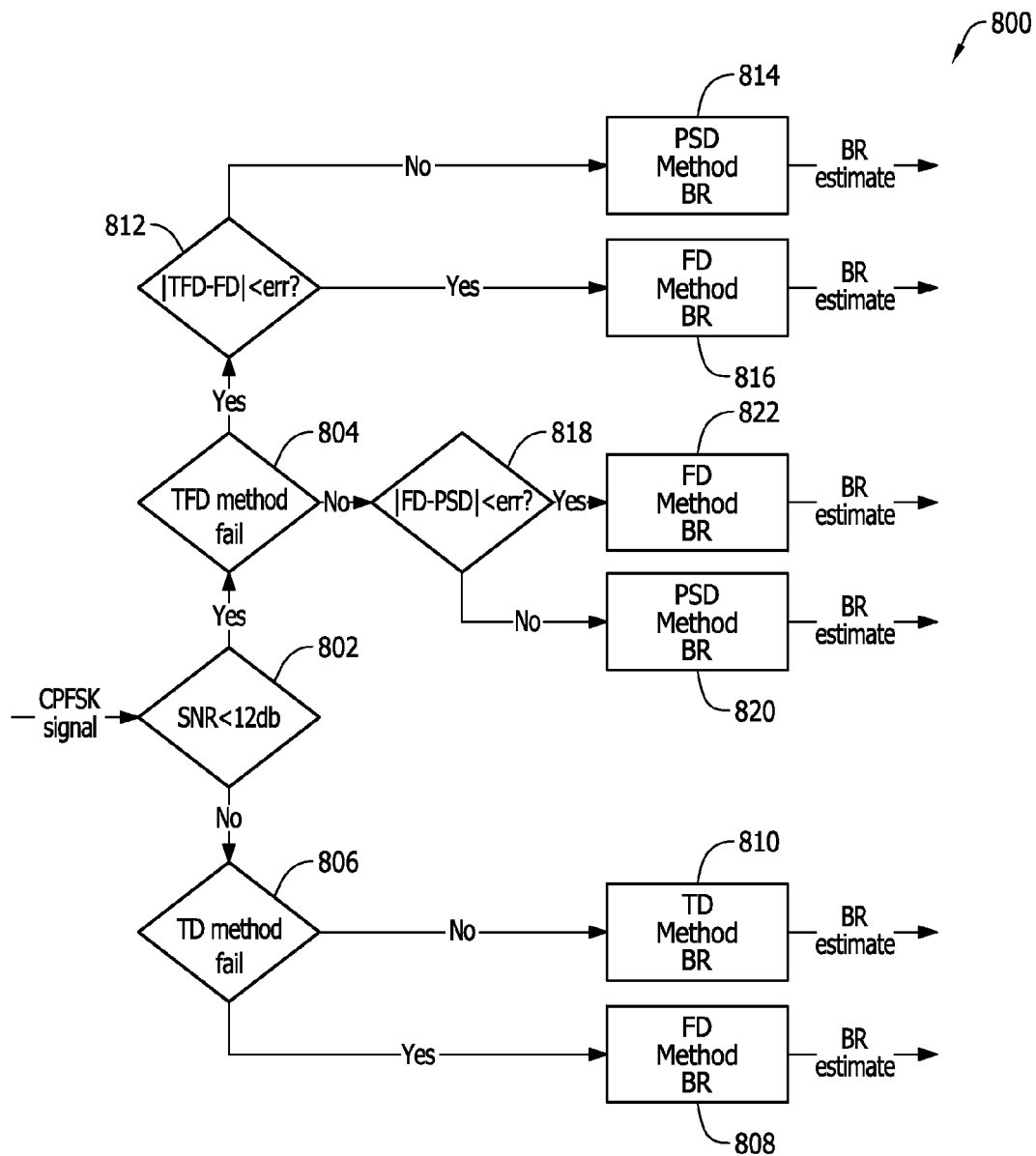
FIG. 8 is a flow diagram of exemplary logic for an amalgamation signal processing method combing the methods disclosed herein with conventional signal processing methods.

After analyzing the strengths and weaknesses of conventional methods against the exemplary PSD shape method, an amalgamation of these four methods may be constructed. FIG. 8 is a flow diagram of an exemplary logic 800 for an amalgamation approach. Logic 800 applies to baud rate estimation, but could be implemented for other parameter types as well.

Figure 9:
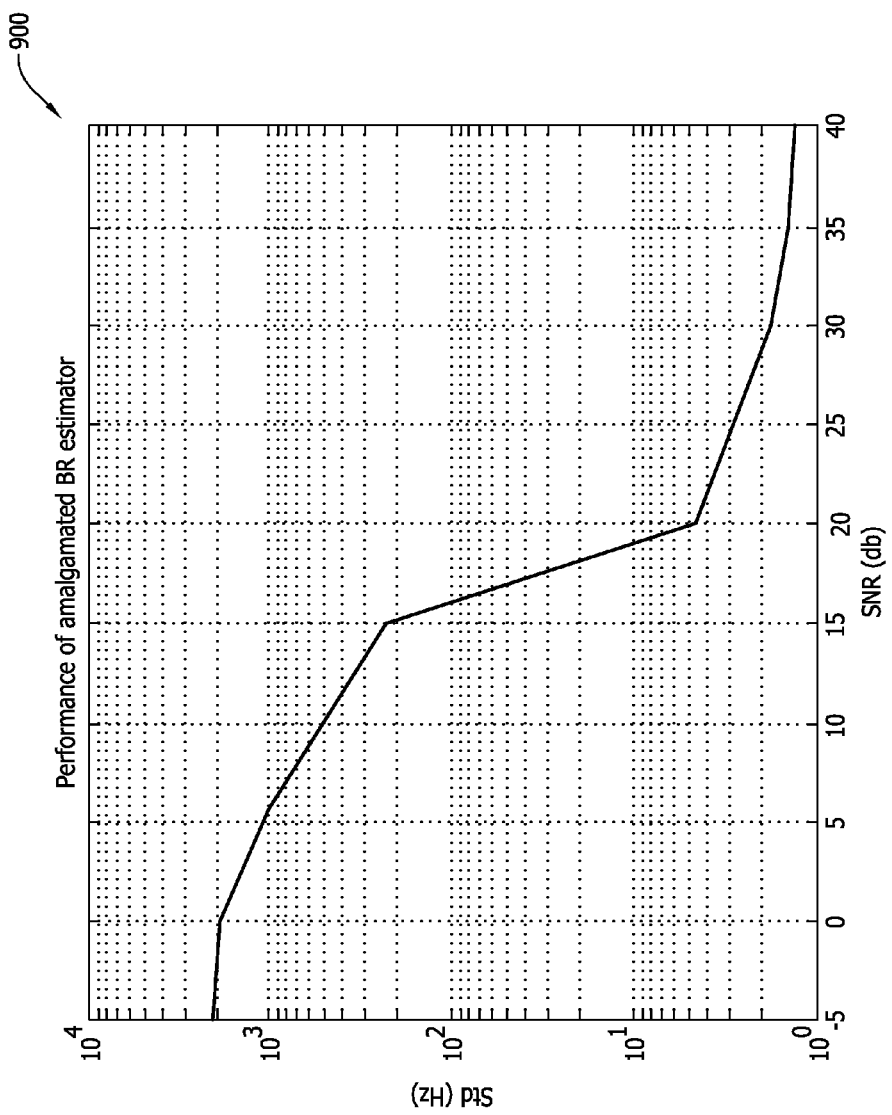
FIG. 9 includes a graph showing the performance of the algorithm described in FIG. 8.

Logic 800 was used to produce graph 900 shown in FIG. 9. In graph 900, the line shows the RMS error after removing outliers (a much better representation of true error in most cases). The curve shape represents a nearly optimal approach that captures both ends of the SNR range, which is not possible using only a single estimation method.

In logic 800, at block 802, it is determined whether or not the SNR of the input CPFSK signal is less than 12 dB. If the SNR is less than 12 dB, flow proceeds to block 804. If the SNR is not less than 12 dB, flow proceeds to block 806. At block 806, the TD method is applied; if the TD method fails, flow proceeds to block 808, where the baud rate is estimated using the FD method. If the TD method does not fail, the baud rate is estimated using the TD method at block 810.

Returning to block 804, the TFD method is applied; if the TFD method fails, flow proceeds to block 812. At block 812, if the difference between the results of the TFD method and the FD method is not less than the error, flow proceeds to block 814, wherein the baud rate is estimated using the PSD shape method described herein. If the difference between the results of the TFD method and the FD method is less than the error, flow proceeds to block 816, wherein the baud rate is estimated using the FD method.

Returning to block 804, if the TFD method does not fail, flow proceeds to block 818. At block 818, if the difference between the results of the PSD shape method and the FD method is not less than the error, flow proceeds to block 820, wherein the baud rate is estimated using the PSD shape method. If the difference between the results of the PSD shape method and the FD method is less than the error, flow proceeds to block 822, wherein the baud rate is estimated using the FD method.

Figure 10:
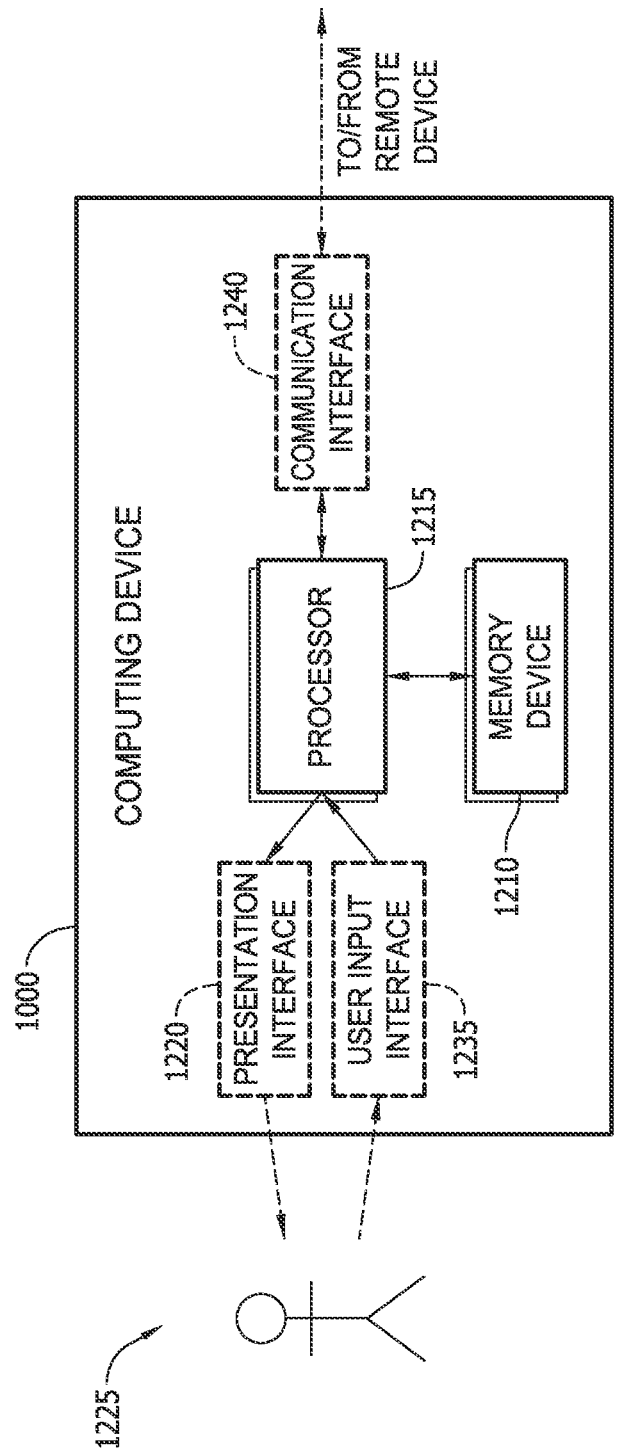
FIG. 10 is a block diagram of an exemplary signal processing device.

FIG. 10 is a block diagram of signal processing device 1000 that may be used with methodology 100 (shown in FIG. 1), methodology 200 (Shown in FIG. 2), and logic 800 (shown in FIG. 8). Signal processing device 1000 includes at least one memory device 1210 and a processor 1215 that is coupled to memory device 1210 for executing instructions. In some implementations, executable instructions are stored in memory device 1210. In the exemplary implementation, signal processing device 1000 performs one or more operations described herein by programming processor 1215. For example, processor 1215 may be programmed by encoding an operation as one or more executable instructions and by providing the executable instructions in memory device 1210.

Processor 1215 may include one or more processing units (e.g., in a multi-core configuration). Further, processor 1215 may be implemented using one or more heterogeneous processor systems in which a main processor is present with secondary processors on a single chip. In another illustrative example, processor 1215 may be a symmetric multi-processor system containing multiple processors of the same type. Further, processor 1215 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary implementation, processor 1215 processes signals to output parameter estimates, as described herein.

In the exemplary implementation, memory device 1210 is one or more devices that enable information such as executable instructions and/or other data to be stored and retrieved. Memory device 1210 may include one or more computer readable media, such as, without limitation, dynamic random access memory (DRAM), static random access memory (SRAM), a solid state disk, and/or a hard disk. Memory device 1210 may be configured to store, without limitation, application source code, application object code, source code portions of interest, object code portions of interest, configuration data, execution events and/or any other type of data. Further, reference templates may be stored on memory device 1210.

In the exemplary implementation, signal processing device 1000 includes a presentation interface 1220 that is coupled to processor 1215. Presentation interface 1220 presents information to a user 1225. For example, presentation interface 1220 may include a display adapter (not shown) that may be coupled to a display device, such as a cathode ray tube (CRT), a liquid crystal display (LCD), an organic LED (OLED) display, and/or an "electronic ink" display. In some implementations, presentation interface 1220 includes one or more display devices. Presentation information 1220 may display, for example, the estimated signal parameters.

In the exemplary implementation, signal processing device 1000 includes a user input interface 1235. User input interface 1235 is coupled to processor 1215 and receives input from user 1225. User input interface 1235 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 1220 and user input interface 1235.

Signal processing device 1000, in the exemplary implementation, includes a communication interface 1240 coupled to processor 1215. Communication interface 1240 communicates with one or more remote devices. To communicate with remote devices, communication interface 1240 may include, for example, a wired network adapter, a wireless network adapter, and/or a mobile telecommunications adapter.

The systems and methods described herein use statistical methods based on the shape of a signal's power spectral density to pull out signal information for use in detection within competitive channels for SDR and cognitive radio applications. The embodiments described herein allow for more precise signal detection and parameter estimation, particularly for weak signals.

Once parameters are estimated for an existing signal of interest, one or more original signals may be generated and transmitted (e.g., by signal processing device 100) such that the one or more original signals avoid interference with the signal of interest. That is, by generating and transmitting an original, non-interfering signal having parameter values different from those of the estimated parameters of the signal of interest, interference between the original signal and the signal of interest is reduced.

Further, the embodiments described have the following advantages: ability to operate far below the communications SNR limit, accurate parameter estimates for signals with low SNR, gradual parameter estimation error increase as SNR is lowered (leading to better signal detection tracking), a very general technique applicable to all legacy signal types including those not CDMA-related, and providing a method with complementary characteristics to traditional signal detection and parameter estimation, leading to a single amalgamated method covering a wide range of conditions. These advantages provide many benefits directly to SDR and cognitive radio applications operating in a competitive spectrum environment.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A signal processing method comprising:
   receiving, at a signal processing system, a signal of interest;
   calculating, using the signal processing system, a power spectral density shape for the signal of interest;
   calculating, using the signal processing system and after said calculating the power spectral density shape, a basis vector based on the power spectral density shape;
   performing, using the signal processing system and after said calculating the basis vector, a linear regression using the basis vector to generate at least one estimate for at least one parameter of the signal of interest; and
   transmitting, after said performing the linear regression and based on the at least one generated estimate, a signal that avoids interference with the signal of interest.

2. The signal processing method in accordance with claim 1, wherein receiving the signal of interest comprises receiving the signal of interest at a software-defined radio system.

3. The signal processing method in accordance with claim 1, wherein the at least one parameter includes a frequency deviation of the signal of interest.

4. The signal processing method in accordance with claim 1, wherein the at least one parameter includes a baud rate of the signal of interest.

5. The signal processing method in accordance with claim 1, wherein the at least one parameter includes a modulation index of the signal of interest.

6. The signal processing method in accordance with claim 1, wherein receiving the signal of interest comprises receiving the signal of interest having a signal-to-noise ratio less than 12 dB.

7. The signal processing method in accordance with claim 1, wherein receiving the signal of interest comprises receiving a continuous phase frequency shift keying (CPFSK) modulated message.

8. A signal processing system for processing a signal of interest transmitted by a signal source, said signal processing system comprising:
   a receiver configured to receive the signal of interest from the signal source;
   a memory device; and
   a processor communicatively coupled to said memory device, said processor configured to:
      calculate a power spectral density shape for the signal of interest;
      calculate, after said processor calculates the power spectral density shape, a basis vector based on the power spectral density shape;
      perform, after said processor calculates the basis vector, a linear regression using the basis vector to generate at least one estimate for at least one parameter of the signal of interest; and generate, after said processor performs the linear regression and based on the at least one generated estimate, a signal that avoids interference with the signal of interest.

9. The signal processing system in accordance with claim 8, wherein said signal processing system is a software-defined radio system.

10. The signal processing system in accordance with claim 8, wherein the at least one parameter includes a frequency deviation of the signal of interest.

11. The signal processing system in accordance with claim 8, wherein the at least one parameter includes a baud rate of the signal of interest.

12. The signal processing system in accordance with claim 8, wherein the at least one parameter includes a modulation index of the signal of interest.

13. The signal processing system in accordance with claim 8, wherein to receive the signal of interest, said receiver is configured to receive the signal of interest having a signal-to-noise ratio less than 12 dB.

14. The signal processing system in accordance with claim 8, wherein to receive the signal of interest, said receiver is configured to receive a continuous phase frequency shift keying (CPFSK) modulated message.

15. A signal processing method comprising:
receiving, at a signal processing system, a signal of interest;
determining, using the signal processing system, a signal to noise ratio (SNR) for the signal of interest;
determining, using the signal processing system, a power spectral density shape for the signal of interest;
determining, using the signal processing system and after said determining the power spectral density shape, a basis vector based on the power spectral density;

selecting, using the signal processing system and after said determining the SNR, a signal processing technique from a plurality of signal processing techniques based at least in part on the determined SNR;

processing, using the signal processing system and after said selecting the signal processing technique, the signal of interest using the selected signal processing technique to generate, with a linear regression using the basis vector, at least one estimate for at least one parameter of the signal of interest; and transmitting, after said processing the signal of interest and based on the at least one generated estimate, a signal that avoids interference with the signal of interest.

16. The signal processing method in accordance with claim 15, wherein selecting a signal processing technique comprises selecting a signal processing technique based on whether or not the determined SNR is below 12 dB.

17. The signal processing method in accordance with claim 15, wherein the plurality of signal processing techniques include a time-based demodulation technique, a frequency-based demodulation technique, a filtered time-based demodulation technique, and a power spectral density technique.

18. The signal processing method in accordance with claim 15, wherein receiving the signal of interest comprises receiving the signal of interest at a software-defined radio system.

19. The signal processing method in accordance with claim 15, wherein receiving the signal of interest comprises receiving a continuous phase frequency shift keying (CPFSK) modulated message.

20. The signal processing method in accordance with claim 15, wherein the at least one parameter of the signal of interest includes at least one of a frequency deviation, a baud rate, and a modulation index.

* * * * *